United States Patent
Hao et al.

(10) Patent No.: US 7,460,487 B2
(45) Date of Patent: Dec. 2, 2008

(54) ACCELERATED PER-FLOW TRAFFIC ESTIMATION

(75) Inventors: Fang Hao, Morganville, NJ (US);
Muralidharan S. Kodialam, Marlboro, NJ (US); Tirunell V. Lakshman, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 666 days.

(21) Appl. No.: 10/947,072

(22) Filed: Sep. 22, 2004

(65) Prior Publication Data

US 2005/0270985 A1 Dec. 8, 2005

Related U.S. Application Data

(60) Provisional application No. 60/577,279, filed on Jun. 4, 2004.

(51) Int. Cl.
*H04L 12/26* (2006.01)

(52) U.S. Cl. .................. 370/253; 370/232; 370/252; 709/224

(58) Field of Classification Search ......... 370/232–235, 370/252, 253; 379/133, 134, 243, 244; 709/224
See application file for complete search history.

(56) References Cited

U.S. PATENT DOCUMENTS

| | | | |
|---|---|---|---|
| 5,864,611 A | | 1/1999 | Ching et al. |
| 6,122,254 A | * | 9/2000 | Aydemir et al. ............. 370/235 |
| 6,504,820 B1 | * | 1/2003 | Oliva ......................... 370/232 |
| 6,549,517 B1 | * | 4/2003 | Aweya et al. ............ 370/236.1 |
| 6,738,355 B1 | | 5/2004 | Love et al. |
| 2002/0163887 A1 | * | 11/2002 | Suni ........................... 370/232 |
| 2002/0165958 A1 | * | 11/2002 | Duffield et al. ............. 709/224 |
| 2003/0189904 A1 | | 10/2003 | Li |

FOREIGN PATENT DOCUMENTS

| | | |
|---|---|---|
| EP | 877534 A2 * | 11/1998 |
| WO | WO 2006067772 A1 * | 6/2006 |

OTHER PUBLICATIONS

Lin, Pei-Wei et al., "Robust Estimation of the Dynamic Origin-Destination Matrix for a Freeway Network," IEEE International Conference on Networking, Sensing and Control, 2004, vol. 2, pp. 862-867.*

"New Directions in Traffic Measurement and Accounting: Focusing on the Elephants, Ignoring the Mice," Crstian Estan and George Varghese, ACM Transactions on Computer Systems, Association for Computing Machinery, New York, US, vol. 21, No. 3, Aug. 2003, pp. 270-313.

(Continued)

*Primary Examiner*—Chi H. Pham
*Assistant Examiner*—Donald L Mills

(57) ABSTRACT

A method of estimating per-flow traffic in a network of nodes interconnected by links splits the incoming traffic stream to a node into a number of parallel sub-streams by flow assignment using a hash function. Since each flow in the incoming traffic stream constitutes a larger fraction of the traffic in its sub-stream, the probability of obtaining two-runs increases. The number of two-runs per flow is then employed to generate an estimate of the traffic of the flow.

12 Claims, 3 Drawing Sheets

OTHER PUBLICATIONS

"Runs bAsed Traffic Estimator (RATE): A Simple, Memory Efficient Scheme for Per-Flow Rate Estimation," Murali Kodialam et al., 2004 IEEE, vol. 3, Mar. 7, 2004, pp. 1808-1818.

"Hashing-Based Traffic Splitting Algorithm for Internet Load Balancing," Zhiruo Cao et al., Technical Report Bell Laboratories, Lucent Technoliges, May 1999, pp. 1-21.

* cited by examiner

ACCELERATED PER-FLOW TRAFFIC ESTIMATION

CROSS-REFERENCE TO RELATED APPLICATIONS

This application claims the benefit of the filing date of U.S. provisional application No. 60/577,279, filed on Jun. 4, 2004.

This application is related to U.S. patent application Ser. No. 10/947,070 filed Sep. 22, 2004 and on the same date as the filing of this application, the teachings of which are incorporated herein by reference.

BACKGROUND OF THE INVENTION

1. Field of the Invention

The present invention relates to data transfer between nodes in a communications network, and, more particularly, to generating estimates of per-flow traffic through the network.

2. Description of the Related Art

Accurate measurement of traffic in a packet network is an important component of traffic management, accounting, denial of service (DoS) detection, and traffic engineering. The traffic in the network might be classified into network flows, with traffic measurements performed on a per-flow basis. The definition of a network flow varies depending on the application. For example, flows might be characterized by the 5-tuples in the IP packet header (e.g., source/destination ports/addresses), by the specific destination (e.g., node or network characterized by a destination address prefix), or by the source network. For virus or worm detection, a flow might also be defined as packets containing a specific worm signature. For this expanded definition of a flow, checking whether a packet belongs to a particular flow is an expensive operation in terms of network resources. Thus, it is desirable to avoid performing this operation for flow rate measurements on every packet.

One prior art approach used for measuring traffic is to sample the traffic arriving at a node (e.g., at the node's router), maintain a count of traffic arrivals on a per-flow basis, and then estimate the per-flow traffic based on this traffic-arrival count. However, for a large number of flows, this prior art approach requires considerable memory and processing resources to maintain the per-flow traffic-arrival counts. In some cases, as many as 0.5-1.0 million flows might be present in a backbone packet network. Since measurement of per-flow traffic has several applications in real-time traffic management, billing, and network security, accurate per-flow rate information should be obtained efficiently without maintaining per-flow states for all flows traversing a router or a network link.

Some particularly important measurement applications are for DoS, active queue management, and virus/worm detection. For DoS applications, a sudden increase in traffic flow toward a given destination might signal the onset of a DoS attack. An estimation might be employed to determine that the traffic at a network node is anomalous, triggering an alarm and activating more-detailed monitoring of the suspect flow (traffic stream). For active queue management, per-flow measurements allow for queuing fairness in networks. Isolating large flows of mis-behaving sources reduces their impact on the rest of the flows in the network, especially for uncontrolled flows of open-loop user data protocol (UDP) sources or transmission control protocol (TCP) sources exhibiting wide disparity in round-trip times. However, identifying and tracking a relatively small number of flows from mis-behaving sources is not desirable since it may require tracking a large number (tens to hundreds of thousands) of small sources as well.

For virus/worm detection applications, packet payload might be considered as a flow in order to detect virus/worm attacks in the network. Several packets with the same payload might indicate the start of a virus/worm spreading through the network. Common payloads, such as those containing the addresses of popular web sites, should not trigger an alarm, while polymorphic worms, that have similar but not identical payloads, should be identified. Measuring packets having the same or similar payload might allow such discrimination between desirable and undesirable packet payloads.

Other applications include tracking of flows that consume excessive memory or processing resources ("heavy hitters"). One method of identifying and tracking these heavy hitters samples packets of the flows with an assumed probability density, and, if the flow to which the packet belongs is not already in memory, then the flow is added to the memory. From that point on, all packets arriving at the node and belonging to this flow are counted. Since every packet is counted, the sampled flows are kept in a hash table and, at every packet arrival, the packet flow id is hashed into the hash table in order to increment the appropriate counter. Therefore, there is increased processing at each packet arrival compared to random sampling, but the method is relatively easy to implement since the size of the memory is reduced.

However, most methods of the prior art for flow estimation still require large sample sizes, with corresponding large memory requirements. In addition, such processing might require considerable processing resources and considerable time to complete.

SUMMARY OF THE INVENTION

[990.524] A method of estimating per-flow traffic in a network of nodes interconnected by links splits the incoming traffic stream to a node into a number of parallel sub-streams by flow assignment using a hash function. Since each flow in the incoming traffic stream constitutes a larger fraction of the traffic in its sub-stream, the probability of obtaining N-runs (N consecutive same-flow arrivals) increases within that sub-stream. The number of N-runs per flow is then employed to generate an estimate of the traffic of the flow.

In accordance with exemplary embodiments of the present invention, proportions of traffic for flows in a network node are provided by (i) determining, based on a hashing function, to which sub-stream a packet of a flow of an input packet stream the packet belongs to; (ii) updating, for each flow, 1) a total sample count, 2) a sub-stream sample count for each sample stream, and 3) a sampling interval; (iii) measuring a number of runs for each flow; (iv) testing whether the sampling interval satisfies a predefined accuracy level; and (v) generating, if the sampling interval satisfies a predefined accuracy level, a proportion of flow in the input packet stream for each flow based on the corresponding number of runs.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
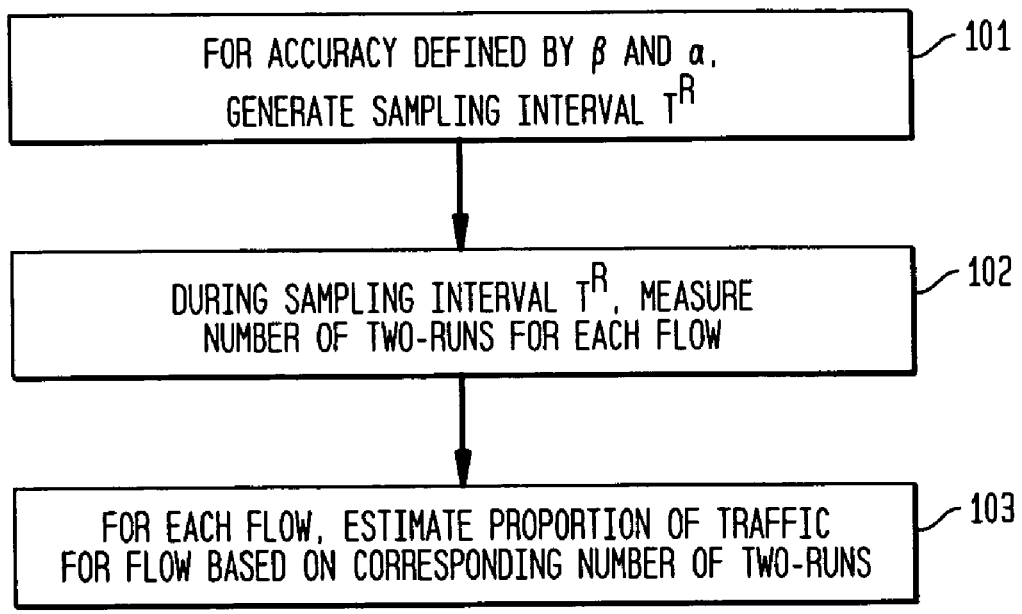
FIG. 1 shows a flow diagram of a first exemplary embodiment of per-flow estimation.

As an aid to understanding the present invention, the following definitions are described. The present invention relates to traffic measurement through measurement of network flows, which flow is predefined based on the traffic measurement application. A set F of flows occurs at a node, such as a router. Each packet (also termed an arrival) belongs to one flow f of the set F (i.e., f∈F). The rate of arrivals to flow f∈F is denoted α(f), and the total arrival rate (in packets/second) to the node is denoted by λ, where $$\lambda = \sum_{f \in F} a(f).$$

The proportion of traffic to the node that belongs to flow f∈F is denoted p(f), where p(f)=(α(f)/λ).

In accordance with exemplary embodiments of the present invention, an estimate â(f) for α(f) is generated for each f∈F. In particular, since measuring λ might be accomplished relatively easily, an estimate p̂(f) is determined for p(f) for each f∈F, and then the estimate λp̂(f) is employed to generate the estimate â(f) for α(f). The value of p(f) is related to the probability that an arriving packet belongs to flow f, and p(f) might be relatively stationary over the time period in which the estimation is performed (the estimation or sampling period). The probability that an arriving packet belongs to a given flow f might be independent of all other packet arrival probabilities. Even if the arrivals to a given node are dependent (i.e., if the flow id of the next packet arriving at a node is dependent on the flow id of the current packet), then random sampling of the arriving stream removes or mitigates this dependence.

The sampling method determines, for any given flow f∈F, an estimate p̂(f) for p(f) such that equation (1) is true:

$$\hat{p}(f) \in \left(p(f) - \frac{\beta}{2}, p(f) + \frac{\beta}{2}\right), \quad (1)$$

with probability greater than α. Thus, an error of ±β/2 might be tolerated with probability less than α.

For example, the requirement on sampling might be as follows: at the end of a sampling period, given any flow f, determine p(f) within an error ±β/2 of ±0.00005 and with a probability α greater than 99.99%. This requirement translates to β=0.0001 and α=0.9999. N(a,b) represents a normal distribution with mean a and variance b, and $Z_\alpha$ denote the α percentile for the unit normal distribution. If α=99.99% then $Z_\alpha$=4.0.

The amount of time needed to estimate all the flows to the desired level of accuracy is the estimation time, also referred to as the sampling interval. For the described embodiments herein, the estimation time is given in terms of the number of samples for the desired level of accuracy, which, for constant packet arrival rates, is directly translated into a time measure.

In accordance with a first exemplary embodiment, a runs-based traffic estimator (RATE) method determines the proportion of traffic sent by each flow. The RATE method samples only a subset of the arriving traffic at the node, but selects this subset such that flows that send a larger proportion of the traffic are sampled more frequently. Such selective sampling is enabled using two-run sampling. A flow f∈F is defined to have a two-run if two consecutive samples belong to the same flow f. Since flow sources generating relatively few packets are sampled with very low probability, the list of flow sources that are detected with two-run sampling might be relatively small. Because this list is small, a given implementation of RATE might exhibit relatively high memory efficiency.

RATE detects and measures two-runs by maintaining the following information. A two-run (detecting) register (TRR) holds only one flow identifier (flow id), which is typically the flow id of the last received sample. If the flow id of the sample of the current flow is the same as the content (value) of the register, then a two-run is detected. A two-run count table (described below) is updated, and the value of TRR is set to null. If the flow id of the current sample is different from the value of TRR, then TRR is set to the flow id of the current sample.

The two-run count table (TCT) maintains counts for the number of two-runs for each flow that has had a detected two-run. When a two-run is detected for a particular flow and if the flow is already included in TCT, then the two-run count for the flow is incremented by one. If the flow for which a two-run has been detected is not included in TCT, its flow id is added to TCT and its count is initialized to one.

Although the embodiments are described herein with respect to two-run counts, the embodiments are not so limited. One skilled in the art might extend the teachings herein to longer runs, such as N-run counts, N a positive integer greater than 2 (e.g., three-run), or such as occurrences within distinct groups of samples, such as two occurrences in three consecutive samples. Consequently, as employed herein, the term run encompasses all such variations.

FIG. 1 shows a flow diagram of a first exemplary embodiment of the RATE method of per-flow estimation. The RATE method estimates the proportion of traffic due to flow f in the following manner. At step 101, given the desired estimation accuracy as a confidence interval (error) parameter β and probability α, the RATE method first determines the number of samples $T^R$ (the superscript "R" indicates that this is the number of samples in an interval needed for the RATE method). At step 102, during this sampling interval of $T^R$, the RATE method measures the number of two-runs $N_2(f)$ for each flow f∈F. At step 103, the proportion of traffic due to each flow f is estimated from $N_2(f)$.

For steps 101 and 103, the following example for a standard normal distribution illustrates how to generate a sampling interval and how to estimate the proportion of traffic from the number of two-runs during a sampling interval. The variable $N_2$ (is the number of two-runs for flow f in $T^R$ samples and function $g(x)=\frac{1}{2}(x+\sqrt{4x+x^2})$. Then equation (2) holds true:

$$\sqrt{T^R}\left[g\left(\frac{N_2(f)}{T^R}\right) - p(f)\right] \sim N[0, \sigma(f)], \quad (2)$$

and, consequently, the estimate p̂(f) is as given in equation (3):

$$\hat{p}(f) = \frac{1}{2}\left(\frac{N_2(f)}{T^R} + \sqrt{4\frac{N_2(f)}{T^R} + \left(\frac{N_2(f)}{T^R}\right)^2}\right). \quad (3)$$

For equations (2) and (3), the variance σ(f) of p(f) (or its estimate $\hat{\sigma}(f)$, if the estimated proportion $\hat{p}(f)$ is used) is as given in equation (4):

$$\sigma(f) = \frac{(1-p(f))(1+p(f))(1+3p(f)+p^2(f))}{(2+p(f))^2}. \quad (4)$$

The α-percentile confidence interval for the estimate $\hat{p}(f)$ is computed as follows: if $Z_\alpha$ denotes the α-percentile of a standard normal distribution N[0,σ], then the α-percentile confidence interval for the estimate of p(f) is given in equation (5):

$$\hat{p}(f) \pm \frac{Z_\alpha}{2}\sqrt{\sigma(f)}. \quad (5)$$

If the α percentile confidence interval should not be wider than β, then σ(f)≦0.345 for all values of p(f). Therefore, the confidence interval is not greater than the quantity of equation (6):

$$2\sqrt{\frac{Z_\alpha 0.345}{T^R}}. \quad (6)$$

The quantity of equation (6) is set to be less than β and the inequality is solved for $T^R$ to determine the length of time to sample to reach the objective that the α percentile confidence interval is less than β. The minimum sampling time $T_{min}^R$ is given in equation (7):

$$T_{min}^R = \frac{4Z_\alpha^2 0.345}{\beta^2} = \frac{1.38 Z_\alpha^2}{\beta^2}. \quad (7)$$

For the following description, for a given variable "v" that is a function of flow id i (e.g., p(i) or a(i)"), the notation $v_i$ is also used and is equivalent to v(i).

Figure 2:
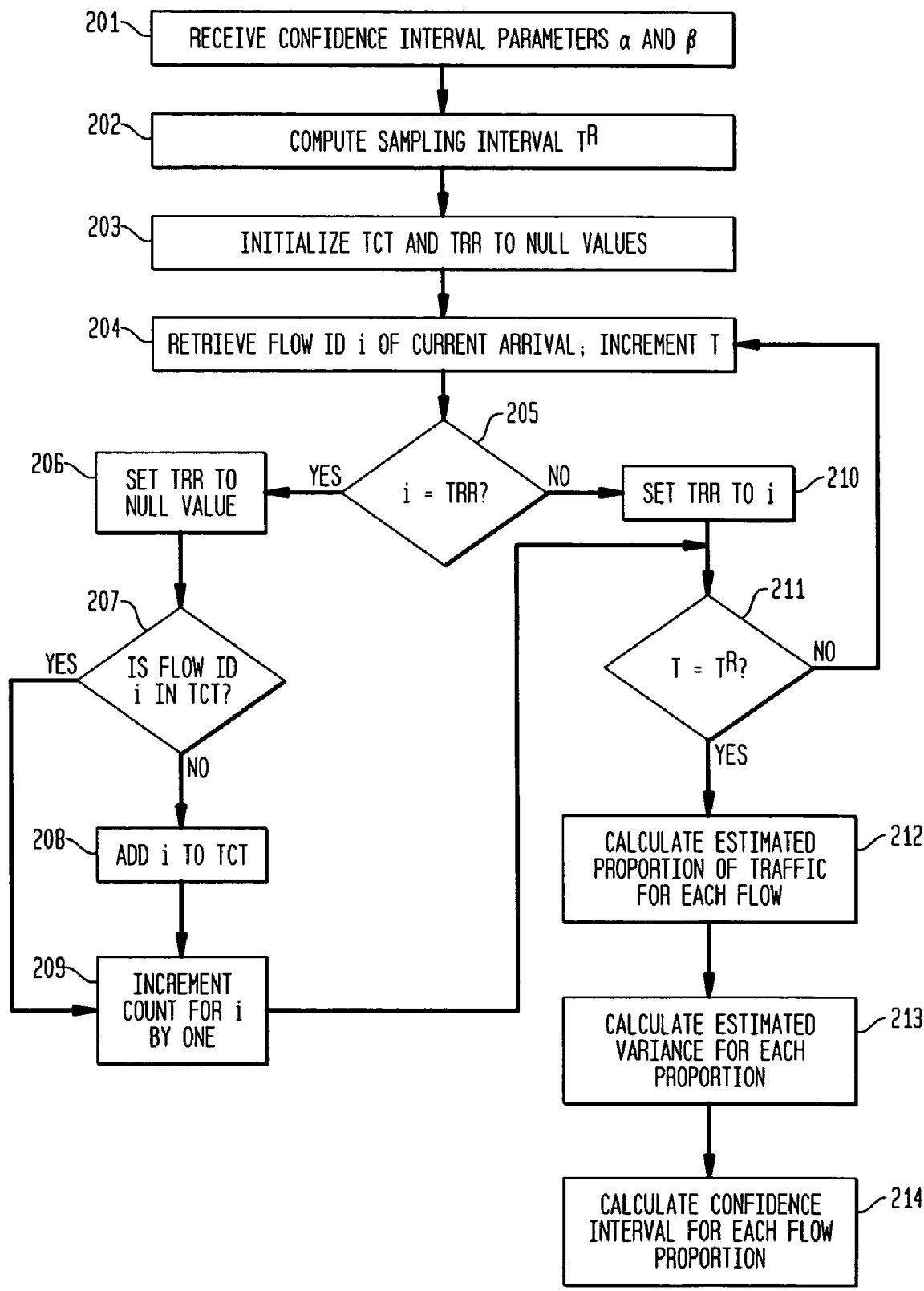
FIG. 2 shows an exemplary implementation of per-flow estimation of FIG. 1.

FIG. 2 shows a block diagram of an exemplary implementation of the method of FIG. 1. At step 201, the input confidence level is defined as an input confidence interval width β and error probability α. At step 202, the sampling interval $T^R$ is computed, such as is given in equation (7), and T set to zero, where T is a counter of the total number of received samples. At step 203, the two-run count table TCT is initialized to the null set and the two-run register TRR is initialized to null.

At step 204, an iterative process begins for each arrival. At step 204, the flow id i of the current arrival is retrieved and T is incremented. At step 205, a test determines whether the flow id i is equivalent to the value of TRR. If the test of step 205 determines that the flow id i is equivalent to the value of TRR, then, at step 206, TRR is set to null.

At step 207, a test determines whether i is an element of TCT (i.e., whether the flow id i is currently an entry in the two-run count table TCT). If the test of step 207 determines that flow id i is not an element of TCT, then, at step 208, the flow id i is added to TCT. If the test of step 207 determines that flow id i is an element of TCT, then the method advances to step 209. At step 209, the count value in TCT for flow id i is incremented by one. From step 209, then the method advances to step 211.

If the test of step 205 determines that the flow id i is not equivalent to the value of TRR, then, at step 210, the value of TRR is set to the current flow id i. From step 210, the method advances to step 211. At step 211, the method tests whether the sampling interval $T^R$ has been reached. If the test of step 211 determines that the sampling interval $T^R$ has not been reached, then the method returns to step 204 for the next arrival.

If the test of step 211 determines that the sampling interval $T^R$ has been reached, then, at step 212, for each i, the method computes an estimate $\hat{p}_i$ of the proportion $p_i$ of traffic for flow id i to the node. For the exemplary normal distribution, at step 212, the method computes estimate $\hat{p}_i$ in accordance with equation (3). At step 213, for each i, the method computes an estimate $\hat{\sigma}_i$ of the variance ai of traffic for flow id i to the node. For the exemplary normal distribution, at step 213, the method computes estimate $\hat{\sigma}_i$ in accordance with equation (4). At step 214, for each i, the method computes the confidence interval for flow id i. For the exemplary normal distribution, at step 214, the method computes the confidence interval for flow id i in accordance with equation (5).

Figure 3:
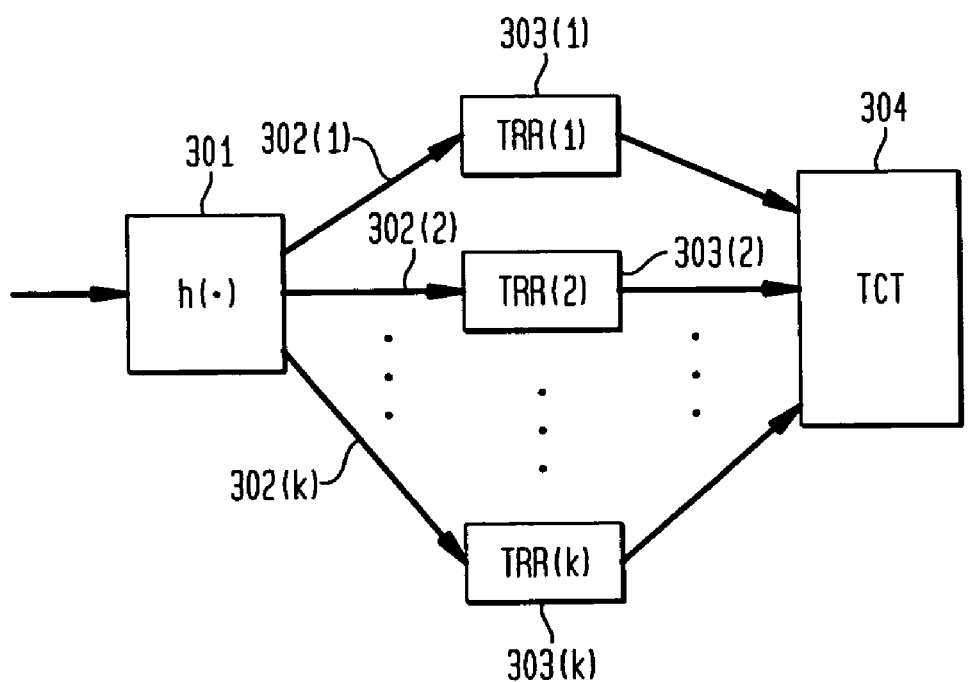
FIG. 3 shows a flow diagram of packet stream processing in accordance with a second exemplary embodiment of per-flow estimation.

In accordance with a second exemplary embodiment, a method of per-flow traffic estimation, termed accelerated RATE (ACCEL-RATE) uniformly hashes the incoming stream into k sub-streams, or buckets, and maintains a two-run count for each flow id allocated to each bucket. Such ACCEL-RATE method might reduce the estimation time of the RATE method by appropriate selection of the value for k through, for example, simulation or experiment. FIG. 3 shows a block diagram of packet stream processing in accordance with the ACCEL-RATE method.

As shown in FIG. 3, packet stream processing for the ACCEL-RATE method comprises hashing module 301, which applies a hashing function to the incoming traffic stream. The application of the hashing function to the incoming traffic stream splits the traffic into k sub-streams 302(1) through 302(k) by assigning flow ids to sub-streams. Each of sub-streams 302(1) through 302(k) has a corresponding two-run register TRR 303(j), 1≦j≦k, operating in a similar manner to that described above for the RATE method. Two-run count table (TCT) 304 maintains a count of detected two-run events for each of the flow ids.

Splitting of the incoming traffic stream provides the following advantage. Each flow associated with a sub-stream constitutes a larger fraction of the total sub-stream traffic and, therefore, the probability of obtaining two-runs is higher than in the original non-split incoming traffic stream of the RATE method.

The flow id (or possibly payload for virus/worm detection) of the incoming stream is first hashed. The set F is the set of possible flows, a packet has a flow id f with f∈F, and h(f) represents the hash function that maps the flow id "f" into the set {1, 2, ..., k} (i.e., the hashing function h(f) sends a packet with flow id f to sub-stream (h(f))). The number of packets over a sample period to achieve a desired level of accuracy is given by $T^A$, where superscript "A" denotes the ACCEL-RATE method. During this sampling interval $T^A$, the hashing function assigns T[j] packets to sub-stream j. Therefore, $$\sum_{j=1}^{k} T[j] = T^A.$$

The ratio r[j] of total traffic through sub-stream j to the total amount of traffic is given in equation (8):

$$r[j] = \frac{T[j]}{T^A} \quad (8)$$

The variable $\phi(f)$ denotes the fraction of traffic in sub-stream (h(f)) that belongs to flow f. Therefore, the proportion p(f) of traffic for flow f arriving at the node is as given in equation (9):

$$p(f) = \phi(f)\frac{T[h(f)]}{T^A} = \phi(f)r[h(f)] \quad (9)$$

In a similar manner to that described above for the RATE method, the derived and estimated proportion, the derived and he estimated variance for the proportion, and the confidence interval for the estimated proportion of traffic for flow f is as follows. Using the relation $$g(x) = \frac{1}{2}\left(x + \sqrt{4x + x^2}\right)$$

and $N_2(f)$ being the number of two-runs for flow f in T[h(f)] packets, then equation (10) holds true:

$$r[h(f)]\left[g\left(\frac{N_2(f)}{T[h(f)]}\right) - \phi(f)\right] \sim N[0, \delta(f)], \quad (10)$$

and, consequently, the estimate $\hat{p}(f)$ is as given in equation (11):

$$\hat{p}(f) = \frac{r[h(f)]}{2}\left(\frac{N_2(f)}{T[h(f)]} + \sqrt{4\frac{N_2(f)}{T[h(f)]} + \left(\frac{N_2(f)}{T[h(f)]}\right)^2}\right). \quad (11)$$

For equations (9) and (10), the variance $\delta(f)$ of p(f) is as given in equation (12):

$$\delta(f) = r^2[h(f)]\frac{(1-\phi(f))(1+\phi(f))(1+3\phi(f)+\phi^2(f))}{T[h(f)](2+\phi(f))^2}. \quad (12)$$

The estimated variance $\hat{\delta}(f)$, if the estimated proportion $\hat{p}(f)$ is used, is as given in equation (13):

$$\hat{\delta}(f) = r[h(f)]\frac{(1-\hat{p}(f))(1+\hat{p}(f))(1+3\hat{p}(f)+\hat{p}^2(f))}{T[h(f)](2+\hat{p}(f))^2}. \quad (13)$$

The $\alpha$-percentile confidence interval for the point estimate is computed as follows: if $Z_\alpha$ denotes the $\alpha$ percentile of a standard normal distribution $N[0,\delta]$, then the $\alpha$-percentile confidence interval for the estimate of p(f) is given in equation (14):

$$\hat{p}(f) \pm \frac{Z_\alpha}{2}\sqrt{\hat{\delta}(f)}. \quad (14)$$

Unlike the RATE method, the estimation time (as a sampling interval, sample size, and sample period) for the ACCEL-RATE method is determined dynamically. For the exemplary normal distribution given by the $\alpha$-percentile confidence interval of equation (14), if the $\alpha$-percentile confidence interval should not be greater than $\beta$, then $$Z_\alpha\sqrt{\hat{\delta}(f)} \leq \frac{\beta}{2}$$

and equation (15) is implied:

$$T^A \geq \frac{1.38 Z_\alpha^2}{\beta^2} r[h(f)], \quad (15)$$

which is true for any flow f independent of which sub-steam it is hashed to. Defining $r_{max}$ as in equation (16):

$$r_{max} = \max_{1 \leq j \leq k} r[h(f)=j], j=1, 2, \ldots, k \quad (16)$$

then equation (15) may be rewritten as in equation (17):

$$T^A = \frac{1.38 Z_\alpha^2}{\beta^2} r_{max}, \quad (17)$$

If the hashing function is uniform, then $r_{max}(1/k)$, and equation (17) may be rewritten as in equation (18):

$$T^A = \frac{1.38 Z_\alpha^2}{k\beta^2}, \quad (18)$$

where $$\frac{T^R}{k} \leq T^A \leq T^R.$$

Consequently, the minimum sampling interval $T^A$ that preserves $\alpha$ and $\beta$ yields $T^A = T^R r_{max}$. Since the sampling interval depends on $r_{max}$, $r_{max}$ is tracked dynamically by the ACCEL-RATE method. However, alternative embodiments might track the sub-stream that receives the greatest amount of traffic, denoted as $T_{max}$, where $r_{max}=(T_{max}/T)$ and T is the total number of packets processed. The ACCEL-RATE method tracks the number T[j] of packets hashed to the jth sub-stream, $1 \leq j \leq k$. The ACCEL-RATE method initializes this variable $T_{max}$ to zero, increments T[j] each time a packet is hashed to the ith sub-stream, compares T[j] with $T_{max}$, and, if T[j] is greater than $T_{max}$, increments $T_{max}$. Then, the quantity $$T^R r_{max} = T^R \frac{T_{max}}{T}$$

is calculated, and the sampling interval is complete if T is greater than this quantity.

Figure 4:
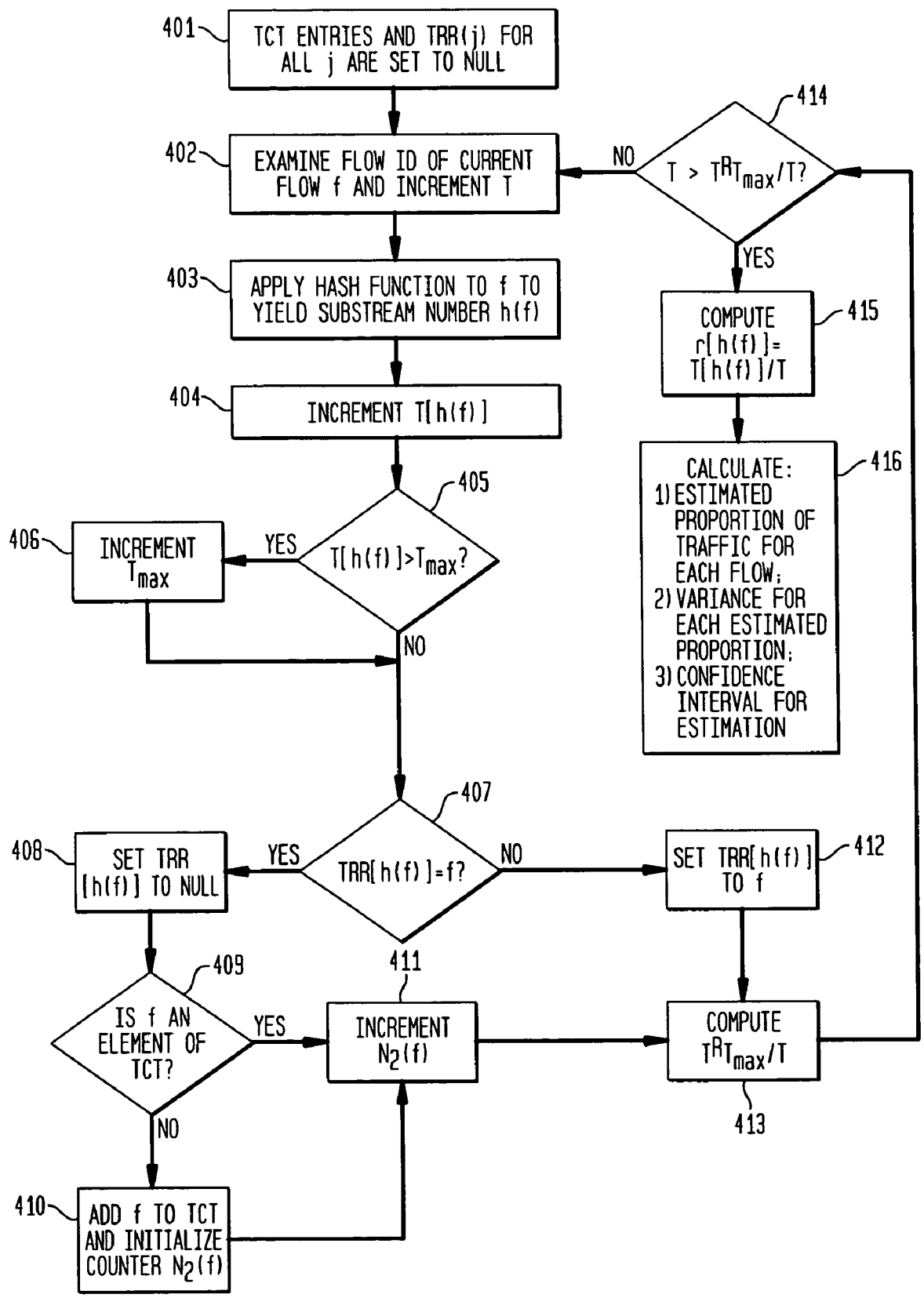
FIG. 4 shows an exemplary implementation of per-flow estimation in accordance with the second exemplary embodiment.

FIG. 4 shows an exemplary implementation of per-flow estimation in accordance with the ACCEL-RATE method. At step 401, the entries of the two-run count table TCT and the two-run registers, TRR[j], $1 \leq j \leq k$, are set to null. The variables for i) the number of arrivals to sub-stream j, T[j], ii) the total number of processed packets, T. and iii) the maximum number of packets sent to any single sub-stream, $T_{max}$, are initialized to zero.

At step 402, the flow id f of the current arrival is examined and T is incremented by one. At step 403, the hash function is applied to f to yield the sub-stream number h(f). At step 404, the value T[h(f)] is incremented by one. At step 405, a test determines whether T[h(f)] is greater than $T_{max}$. If the test of step 405 determines that T[h(f)] is greater than $T_{max}$, then, at step 406, $T_{max}$ is incremented by one and the method advances to step 407. If the test of step 405 determines that T[h(f)] is not greater than $T_{max}$, then the method advances directly to step 407.

At step 407, a test compares the flow id f of the current packet to the value stored in TRR[h(f)]. If the test of step 407 determines that the flow id f of the current packet is equivalent to the value stored in TRR[h(f)], then, at step 408, TRR[h(f)] is set to null. At step 409, a test determines whether flow id f is an element of TCT. If the test of step 409 determines that flow id f is not an element of TCT, then, at step 410, flow id f is added to TCT and the corresponding counter ($N_2(f)$) is initialized. At step 411, the corresponding counter ($N_2(f)$) is incremented. If the test of step 409 determines that flow id f is an element of TCT, then, at step 411, the corresponding counter ($N_2(f)$) in TCT is incremented by one. From step 411, the method advances to step 413.

If the test of step 407 determines that the flow id f of the current packet is not equivalent to the value stored in TRR[h(f)], then, at step 412, TRR[h(f)] is set to flow id f From step 412, the method advances to step 413.

At step 413, the quantity $$T^R \frac{T_{max}}{T}$$

is computed. At step 414, a test determines whether T is less than $$T^R \frac{T_{max}}{T}.$$

If the test of step 414 determines that T is less than $$T^R \frac{T_{max}}{T},$$

then the method returns to step 402 for the next packet arrival. If the test of step 414 determines that T is not less than $$T^R \frac{T_{max}}{T},$$

then the method terminates sampling.

At step 415, the method computes, for each sub-stream, r[h(f)]=T[h(f)]/T. At step 416, the method computes, for each flow f, the estimated proportion $\hat{p}(f)$ of traffic for flow f, estimated variance $\hat{\delta}(f)$ of $\hat{p}(f)$, and the confidence interval for the estimation. For some embodiments, the method might employ the relations of equations (11), (13), and (14) at step 416.

Per-flow traffic estimation in accordance with one or more embodiments may provide for the following advantages. Estimating proportions of traffic for flows at a node allows for relatively rapid estimation time without relatively large memory requirements. In addition, fast transient increases in traffic might be tracked, allowing for enhanced virus/worm detection or for traffic engineering intervention for queuing fairness and for isolation of mis-behaving flows.

The present invention may be embodied in a processor, such as a network controller, router, or computer, and the processor may be coupled to a network or network database to receive network information used by the methods as described herein. In addition, the present invention may be employed for either wired, wireless, optical, or non-optical networks, and may be employed for either synchronous or asynchronous networks.

As would be apparent to one skilled in the art, the various functions of per-flow traffic estimation may be implemented with circuit elements or may also be implemented in the digital domain as processing steps in a software program. Such software may be employed in, for example, a digital signal processor, micro-controller, or general-purpose computer. Consequently, the various functions of a per-flow traffic estimator may be implemented as various modules of a processor with each module embodied in any number of implementations known in the art.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of generating proportions of traffic for flows in a network node, the method comprising the steps of:
   (a) determining, based on a hashing function, to which sub-stream a packet of a flow of an input packet stream the packet belongs to;
   (b) updating, for each flow, i) a total sample count, ii) a sub-stream sample count for each sample stream, and iii) a sampling interval;
   (c) measuring a number of runs for each flow, each run being a predetermined plurality of consecutive samples belonging to the same flow;
   (d) testing whether the sampling interval satisfies a predefined accuracy level;
   (e) generating, if the sampling interval satisfies a predefined accuracy level, a proportion of flow in the input packet stream for each flow based on the corresponding number of runs; and
   (f) using the generated proportion of flow to monitor the network node.

2. The invention of claim 1, further comprising the step of generating a variance for each proportion of flow.

3. The invention of claim 2, wherein the step of generating the variance generates the variance $\delta(f)$ for each proportion $p(f)$ of each flow f as:

$$\delta(f) = r[h(f)]\frac{(1 - p(f))(1 + p(f))(1 + 3p(f) + p^2(f))}{T[h(f)](2 + p(f))^2},$$

where $r[h(f)]$ is the ratio of $T[h(f)]$ to the sample interval, $h(\bullet)$ is the hashing function, and $T[h(f)]$ is the sub-stream sample count for the $h(f)$th sub-stream.

4. The invention of claim 1, further comprising the step of generating a confidence interval for each flow.

5. The invention of claim 1, wherein step (c) generates each proportion $p(f)$ of each flow from the corresponding number of runs $N_2(f)$ as $$p(f) = \frac{r[h(f)]}{2}\left(\frac{N_2(f)}{T[h(f)]} + \sqrt{4\frac{N_2(f)}{T[h(f)]} + \left(\frac{N_2(f)}{T[h(f)]}\right)^2}\right),$$

where $r[h(f)]$ is the ratio of $T[h(f)]$ to the sample interval, $h(\bullet)$ is the hashing function, $N_2(f)$ is the number of runs for flow f, and $T[h(f)]$ is the sub-stream sample count for the $h(f)$ th sub-stream.

6. The invention of claim 1, wherein, for step (b) the number of runs is a number of N-runs, where N is a positive integer greater than 1.

7. The invention of claim 6, wherein N is 2.

8. The invention of claim 1, wherein step (b) updates the sample interval each time a flow is hashed to a sub-stream $h(f)$, where $h(\bullet)$ is the hashing function.

9. The invention of claim 8, wherein step (d) tests the sample interval based on:

$$T^R \frac{T_{max}}{T},$$

where $T^R$ is a rate method sampling interval for the given accuracy level, T is the total number of samples, and $T_{max}$ is the sample interval.

10. The invention of claim 1, wherein the method is implemented in a processor of a network controller coupled to the two or more nodes.

11. A network of interconnected nodes having at least one node comprising a processor generating proportions of traffic for flows in a network node, the processor comprising:
    a first processing module adapted to determine, based on a hashing function, to which sub-stream a packet of a flow of an input packet stream the packet belongs to;
    a second processing module adapted to update, for each flow, i) a total sample count, ii) a sub-stream sample count for each sample stream, and iii) a sampling interval;
    a third processing module adapted to measure a number of runs for each flow, each run being a predetermined plurality of consecutive samples belonging to the same flow;
    a fourth processing module adapted to testing whether the sampling interval satisfies a predefined accuracy level; and
    a fifth processing module adapted to generating, if the sampling interval satisfies a predefined accuracy level, a proportion of flow in the input packet stream for each flow based on the corresponding number of runs.

12. A computer-readable medium having stored thereon a plurality of instructions, the plurality of instructions including instructions which, when executed by a processor, cause the processor to implement a method for generating proportions of traffic for flows in a network node, the method comprising the steps of:
    (a) determining, based on a hashing function, to which sub-stream a packet of a flow of an input packet stream the packet belongs to;
    (b) updating, for each flow, i) a total sample count, ii) a sub-stream sample count for each sample stream, and iii) a sampling interval;
    (c) measuring a number of runs for each flow, each run being a predetermined plurality of consecutive samples belonging to the same flow;
    (d) testing whether the sampling interval satisfies a predefined accuracy level; and
    (e) generating, if the sampling interval satisfies a predefined accuracy level, a proportion of flow in the input packet stream for each flow based on the corresponding number of runs.

* * * * *

UNITED STATES PATENT AND TRADEMARK OFFICE
CERTIFICATE OF CORRECTION

PATENT NO. : 7,460,487 B2  Page 1 of 1
APPLICATION NO. : 10/947072
DATED : December 2, 2008
INVENTOR(S) : Fang Hao, Muralidharan S. Kodialam and Tirunell V. Lakshman It is certified that error appears in the above-identified patent and that said Letters Patent is hereby corrected as shown below:

In column 11, on line 47, replace "flow from" with --flow $f$ from--.

In column 11, on line 57, replace "h(f) th" with --h(f)th--.

Signed and Sealed this

Tenth Day of February, 2009

JOHN DOLL
*Acting Director of the United States Patent and Trademark Office*